(12) United States Patent
Lee

(10) Patent No.: US 7,634,029 B2
(45) Date of Patent: Dec. 15, 2009

(54) SYMBOL TIMING RECOVERY APPARATUS USED WITH A VSB-TYPE RECEIVER AND A METHOD OF USING THE SAME

(75) Inventor: Dong-hoon Lee, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 370 days.

(21) Appl. No.: 11/208,754

(22) Filed: Aug. 23, 2005

(65) Prior Publication Data

US 2006/0045210 A1 Mar. 2, 2006

(30) Foreign Application Priority Data

Aug. 26, 2004 (KR) .................. 10-2004-0067499

(51) Int. Cl.
*H04L 27/00* (2006.01)
(52) U.S. Cl. .................. 375/326; 375/270; 329/357; 455/204
(58) Field of Classification Search .................. 375/326, 375/270; 329/357; 455/204
See application file for complete search history.

(56) References Cited

U.S. PATENT DOCUMENTS 4,169,993 A * 10/1979 Taylor et al. .................. 380/34
5,802,461 A * 9/1998 Gatherer ...................... 455/204

6,583,822 B1 6/2003 Jun

FOREIGN PATENT DOCUMENTS

| KR | 2001-63060 A | 7/2001 |
|---|---|---|
| KR | 2001-69141 A | 7/2001 |
| KR | 2002-12399 A | 2/2002 |
| KR | 2002-65745 A | 8/2002 |
| KR | 2004-25294 A | 3/2004 |
| WO | WO 03/088512 | 10/2003 |

OTHER PUBLICATIONS

European Search Report.
Yongchul Song, Low-Jitter Digital Timing Recovery Techniques for CAP-Based VDSL Applications, IEEE Journal of Solid-State Circuits, vol. 38, No. 10, Oct. 2003, pp. 1649-1656.
Korean Office Action dated Apr. 24, 2006 issued in KR 2004-67499.
Chinese Office Action dated Sep. 5, 2008 issued in CN 2005-10093333.4.

* cited by examiner

*Primary Examiner*—Curtis B Odom
(74) *Attorney, Agent, or Firm*—Stanzione & Kim, LLP

(57) ABSTRACT

A symbol timing recovery apparatus used with a VSB-type receiver and a method of the same. In order for the symbol timing recovery, error information is generated and used utilizing a band edge component maximization (BECM) of a frequency band as well as an upper frequency band. Therefore, the symbol timing recovery can be more effectively achieved even when the upper frequency band is damaged due to multi-path components. Also, efficiency of the overall timing recovery can be improved by using the lower frequency band as well as the upper frequency band of the received signal in performing the symbol timing recovery. As a result, deterioration of the receiving system including the symbol timing recovery apparatus can be prevented.

20 Claims, 3 Drawing Sheets

SYMBOL TIMING RECOVERY APPARATUS USED WITH A VSB-TYPE RECEIVER AND A METHOD OF USING THE SAME

CROSS-REFERENCE TO RELATED APPLICATIONS

This application claims benefit under 35 U.S.C. § 119(a) of Korean Patent Application No. 2004-67499, filed Aug. 26, 2004, the entire contents of which are incorporated herein by reference.

BACKGROUND OF THE INVENTION

1. Field of the Invention

The present general inventive concept relates to a symbol timing recovery apparatus used with a vestigial side band (VSB)-type receiver, and a method of using the same. More particularly, the present general inventive concept relates to a symbol timing recovery apparatus used with a vestigial side band (VSB)-type receiver, capable of efficiently performing symbol timing recovery using a lower band, and a method of using the same.

2. Description of the Related Art

When demodulating data in a receiver which receives data transmitted through a vestigial side band (VSB) scheme, the same clock as used in a transmitter should be generated. This process is called 'Symbol Timing Recovery.'

The symbol timing recovery may be performed by a method which uses a data segment synchronizing signal regularly inserted during data transmission by the transmitter or by a method which uses a band edge component maximization (BECM) algorithm.

The BECM algorithm recovers symbol timing by reading phase information of a received signal using a spectral line which is a harmonic signal of an upper frequency band signal of a VSB-modulated received signal. A Gardener algorithm is a typical example of the BECM algorithm.

FIG. 1 is a block diagram of a symbol timing recovery apparatus according to a conventional BECM algorithm.

Referring to FIG. 1, the conventional recovery apparatus 100 comprises an analog-to-digital converter (ADC) 101, a mixer 103, a matched filter 104, a BECM 200, a loop filter 109, and a numerically controlled oscillator (NCO) 111.

The VSB-modulated received signal is converted to a digital signal by the ADC 101. The mixer 103 receives a second NCO signal and converts the digitalized VSB signal to a base-band signal.

From a signal filtered off by the matched filter 105, the BECM 200 outputs error information of a symbol clock. The loop filter 109 outputs NCO controlling voltage corresponding to the error information, thereby adjusting the symbol clock input to the ADC 101.

FIG. 2 is a block diagram illustrating the BECM of FIG. 1. Referring to FIG. 2, the BECM 200 comprises a pre filter 201, a non-linear device 203, a symbol tone extractor 205, and a phase detector 207.

The pre filter 201 receives the VSB-modulated signal, which is passed through the matched filter 105 (FIG. 1), and filters off only the upper frequency band signal. The non-linear device 203 generates harmonic components of the signal output from the pre filter 201. The symbol tone extractor 205 extracts symbol tone from the plurality of harmonics generated by the non-linear device 203. The symbol tone refers to a component having the same frequency as the clock used in the transmitter. The phase detector 207 outputs the error information of a symbol clock (or, symbol phase), which is the information on the error between a preset reference symbol phase and a phase of the extracted symbol tone.

As aforementioned, the symbol timing recovery apparatus using the conventional BECM algorithm uses only the upper frequency band of the received VSB-modulated signals.

However, when the received VSB-modulated signals are distorted on the transmission channel and the signals in the upper frequency band are seriously damaged, performance of the symbol timing recovery apparatus is considerably deteriorated. The damage rate of the upper frequency band signals increases especially in an environment having lots of multi-path components, and this causes deterioration of receiving performance.

SUMMARY OF THE INVENTION

Accordingly, the present general inventive concept provides a symbol timing recovery apparatus for a vestigial side band (VSB)-type receiver, which is capable of efficiently performing symbol timing recovery by using both upper and lower frequency bands of received VSB signals for the symbol timing recovery, even when the upper frequency band of the received VSB signals are damaged due to multi-path environment of a channel, and a method for the same.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing a symbol timing recovery apparatus used with a VSB-type receiver, the apparatus including an analog-to-digital converter (ADC) to receive a signal which is modulated by a vestigial side band (VSB) scheme and to digitalize the received signal using a predetermined sampling clock; a multiplier to transit the digitalized VSB signal to a baseband; a spectrum inverter to invert a spectrum by exchanging upper and lower frequency bands of the baseband VSB signal received from the multiplier; a lower band edge component maximization (BECM) to perform a BECM algorithm with respect to the inverted baseband VSB signal, thereby generating lower error information which is the information on the error between a symbol phase of the received VSB-modulated signal and a preset reference symbol phase; a loop filter to filter the lower error information of the lower BECM to output a lower band signal; and a numerically controlled oscillator (NCO) to change a predetermined sampling clock according to the lower band signal from the loop filter.

The symbol timing recovery apparatus may further include an upper BECM to perform the BECM algorithm directly with respect to the baseband VSB signal received from the multiplier, thereby generating upper error information which is the information on the error between a symbol phase of the received VSB-modulated signal and a preset reference symbol phase; and a combiner to multiply the upper and the lower error information of the upper and the lower BECMs by predetermined weights, respectively, and to output to the loop filter final error information obtained by adding the multiplied values.

The predetermined weights vary according to reliability of the upper and the lower error information according to a channel state.

The spectrum inverter detects and deletes a pilot signal of the VSB signal before inverting the spectrum by exchanging the upper and the lower bands of the frequency spectrum of the baseband VSB signal.

The symbol timing recovery apparatus may further include a matched filter provided in front of the spectrum inverter to filter off the baseband VSB signal so as to increase signal-to-noise ratio.

The VSB-modulated signal is an American digital broadcasting signal of an advanced television system committee (ATSC) standard.

A receiver using a symbol timing recovery apparatus for a VSB-type receiver according to an embodiment of the present general inventive concept, receives a VSB-modulated signal by performing symbol timing recovery of a received VSB signal.

The foregoing and/or other aspects and advantages of the present general inventive concept are also achieved by providing a method of symbol timing recovery for a VSB-type receiver, the method including receiving a VSB-modulated signal and digitalizing the signal using a predetermined sampling clock; transiting the digitalized VSB signal to a baseband; inverting a spectrum by exchanging upper and lower frequency bands of the baseband VSB signal; generating lower error information which is the information on the error between a symbol phase of the received signal and a preset reference symbol phase, by performing BECM algorithm with respect to the spectrum-inverted signal; and changing the predetermined sampling clock according to the lower error information.

The method may further include performing the BECM algorithm directly with respect to the baseband VSB signal in the transiting operation, thereby generating upper error information which is the information on the error between a symbol phase of the received VSB-modulated signal and a preset reference symbol phase; and multiplying the upper and the lower error information by predetermined weights, respectively, and outputting final error information obtained by adding the multiplied values to the sampling clock changing operation.

The predetermined weights vary according to reliability of the upper and the lower error information according to a channel state.

The inverting operation detects and deletes a pilot signal of the VSB signal before inverting the spectrum by exchanging the upper and the lower bands of the frequency spectrum of the baseband VSB signal.

The method may further include filtering off the baseband VSB signal before the inverting operation, so as to increase signal-to-noise ratio.

The foregoing and/or other aspects and advantages of the present general inventive concept are also achieved by providing a symbol timing recovery apparatus used with a VSB-type receiver, the apparatus including a multiplier to transit a digitalized signal modulated by a vestigial side band (VSB) scheme signal to a baseband, and a timing recovery unit to invert a spectrum by exchanging upper and lower frequency bands of the baseband VSB signal received from the multiplier, to perform a lower band edge component maximization (BECM) algorithm with respect to the inverted baseband VSB signal, thereby generating lower error information which is the information on the error between a symbol phase of the received VSB-modulated signal and a preset reference symbol phase, to filter the lower error information of the lower BECM to output a lower band signal, and to change a predetermined sampling clock according to the lower band signal from the loop filter.

The foregoing and/or other aspects and advantages of the present general inventive concept are also achieved by providing a method of symbol timing recovery for a VSB-type receiver, the method including transiting a digitalized VSB-modulated signal to a baseband, inverting a spectrum by exchanging upper and lower frequency bands of the baseband VSB signal, detecting error information of respective symbol clocks from the baseband VSB signals of the lower frequency band and the upper frequency band, and combining the error information detected to perform symbol timing recovery.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
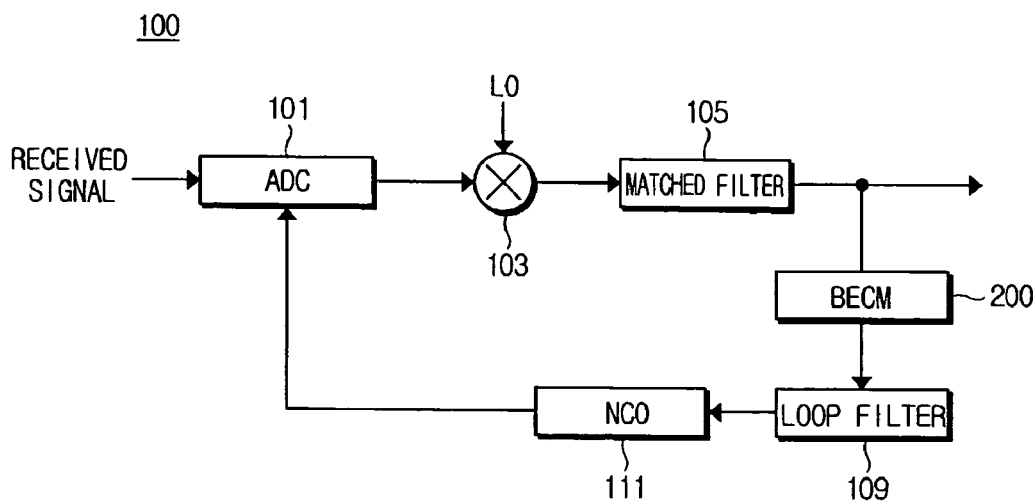
FIG. 1 is a block diagram of a symbol timing recovery apparatus according to a conventional band edge component maximization (BECM) algorithm.
Figure 2:
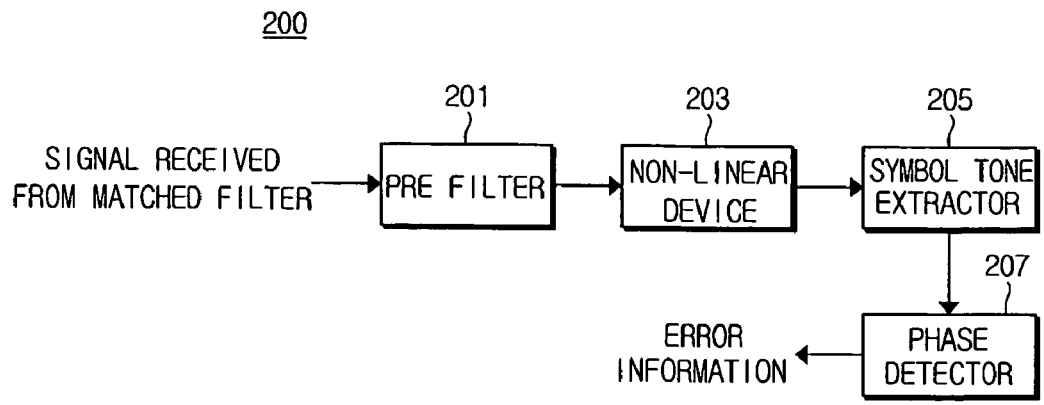
FIG. 2 is a block diagram illustrating an example of a BECM of FIG. 1.

Hereinafter, a certain embodiment of the present general inventive concept will be described in detail with reference to the accompanying drawing figures.

In the following description, same drawing reference numerals are used for the same elements even in different drawings. The matters defined in the description such as a detailed construction and elements are nothing but the ones provided to assist in a comprehensive understanding of the general inventive concept. Thus, it is apparent that the present general inventive concept can be carried out without those defined matters. Also, well-known functions or constructions are not described in detail since they would obscure the general inventive concept in unnecessary detail.

Figure 3:
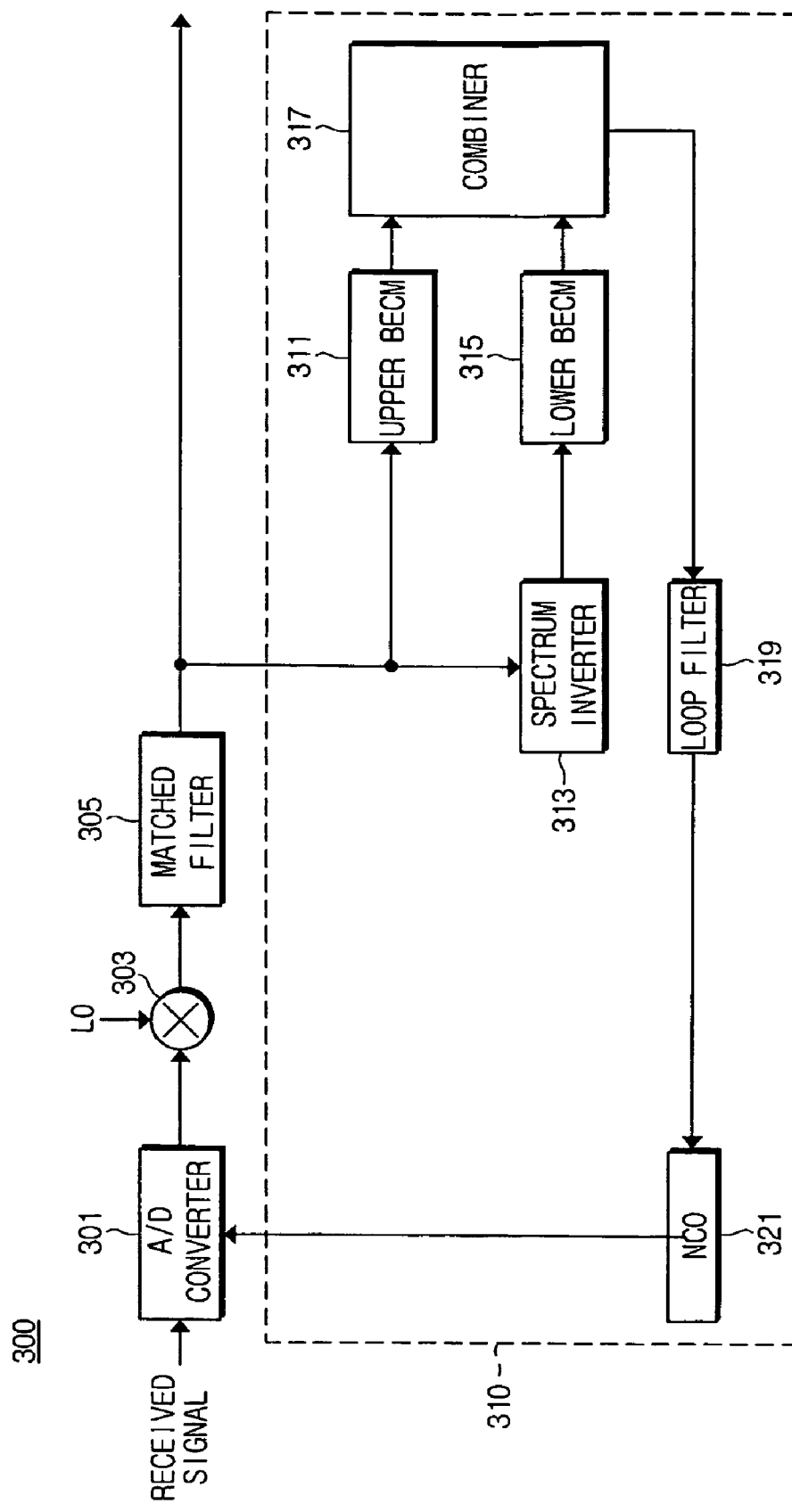
FIG. 3 is a block diagram of a symbol timing recovery apparatus used with a vestigial side band (VSB)-type receiver, according to an embodiment of the present general inventive concept.

FIG. 3 is a block diagram of a symbol timing recovery apparatus used with a vestigial side band (VSB)-type receiver, according to an embodiment of the present general inventive concept.

Referring to FIG. 3, the symbol timing recovery apparatus 300 includes an analog-to-digital converter (ADC) 301, a multiplier 303, a matched filter 305, and a timing recovery unit 310.

The symbol timing recovery apparatus 300 according to an embodiment of the present general inventive concept may be applied as an apparatus which receives and demodulates a signal modulated by vestigial side band (VSB) scheme (hereinafter, referred to as 'VSB signal').

The symbol timing recovery apparatus 300 may be employed by a receiver which receives an American digital broadcasting signal using 8-level VSB scheme of an advanced television system committee (ATSC) standard. Hereinbelow, a description will be made with respect to the receiver receiving the American digital broadcasting signal of the 8-level VSB scheme.

The ADC 301 digitizes a received VSB signal using a clock recovered by the symbol timing recovery apparatus 300. The multiplier 303 converts the digitalized signal to a signal of a baseband by receiving a clock from a local oscillator (LO).

The VSB signal converted to the baseband signal is output through the matched filter 305. The output signal may be input to and equalized by an equalizer (not shown).

The timing recovery unit 310 includes an upper band edge component maximization (BECM) 311, a spectrum inverter 313, a lower BECM 315, a combiner 317, a loop filter 319, and a numerically controlled oscillator (NCO) 321.

The timing recovery unit 310 generates a clock of the same phase as the clock which is used to generate the VSB signal in the transmitter (not shown) when sampling the received VSB signal.

To this end, the timing recovery unit 310 receives the VSB signal digitalized to the baseband signal (hereinafter, referred to as 'baseband VSB signal'). The timing recovery unit 310 receives the signal passed through the matched filter 305.

The timing recovery unit 310 detects the error information of the respective symbol clocks from the baseband VSB signals of the lower frequency band, as well as those of the upper frequency band. By combining the error information, the timing recovery unit 310 is able to effectively perform the symbol timing recovery even when the upper frequency band of the VSB signals is damaged on the transmission channel.

Figure 4:
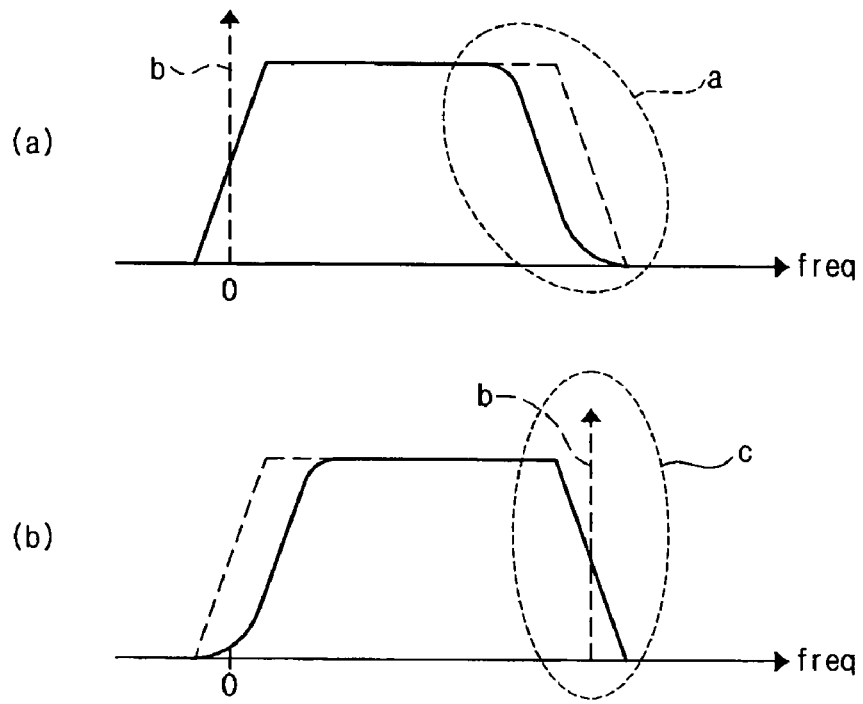
FIG. 4 is a graph illustrating a frequency spectrum of a baseband VSB signal for input to the symbol timing recovery apparatus according to an embodiment of the present general inventive concept.

FIG. 4 illustrates a frequency spectrum of the baseband VSB signal processed in the symbol timing recovery apparatus according to an embodiment of the present general inventive concept.

A graph (a) of FIG. 4 illustrates a frequency spectrum of the baseband VSB signal. The band width of the received signal is approximately 6 MHz, a section 'a' denotes the upper frequency band and a section 'b' denotes a pilot signal.

The baseband VSB signal of the graph (a) is input to the upper BECM 311 to generate the error information of the symbol clock from the upper frequency band of the baseband VSB signal. The signal of the graph (b) is input to the lower BECM 315 to generate the error information of the symbol clock from the lower frequency band of the baseband VSB signal.

The upper and the lower BECMs 311 and 315 generate the error information of the symbol clock using the BECM algorithm, typically a Gardener algorithm.

The upper BECM 311 generates harmonic components of the upper frequency band signal from the frequency VSB signal and extracts symbol tone among the plurality of generated harmonic components, the symbol tone having the same phase as the symbol clock used in the transmitter (not shown). Then, the upper BECM 311 compares the symbol tone with a preset reference symbol phase, thereby outputting upper error information of the symbol phase.

The spectrum inverter 313 receives the frequency VSB signal and inverts the frequency spectrum. By this inversion operation, the upper frequency band and the lower frequency band are exchanged with each other. The output of the spectrum inverter 313 is output to the lower BECM 315.

The lower BECM 315 operates corresponding to the upper BECM unit 311 to output lower error information which is the information on the error between the preset reference symbol phase and the phase of the symbol tone extracted from the received lower frequency band. The signal input to the lower BECM 315 is the baseband VSB signal of which the frequency spectrum is inverted. The lower frequency band of the baseband VSB signal is converted to the upper frequency band and input.

As shown in FIG. 4 (b), the baseband VSB signal inverted by the spectrum inverter 313 and input to the lower BECM 315 includes a pilot signal in the upper frequency band. The lower error information output from the lower BECM 315 by the pilot signal is more reliable than the upper error information. Then, the combiner 317 considers influence of the pilot signal included in the inverted spectrum.

However, the pilot signal may be deleted from the signals input to the lower BECM 315 so that the combiner 317 may not dedicatedly consider the influence of the pilot signal.

For this reason, the pilot signal may be deleted from the signals input to the lower BECM 315. The spectrum inverter 313 detects the pilot signal from the baseband VSB signal and deletes the pilot signal from the baseband VSB signal before inverting the frequency spectrum.

The combiner 317 receives and combines only the upper and the lower error information from the upper and the lower BECM 311 and 315 and outputs the combined information as 'final error information' to the loop filter 319. The combiner 317 multiplies appropriate weights K1 and K2 by the upper and the lower error information, respectively, and adds the multiplied values to thereby generate the final error information.

The weights K1 and K2 may vary according to a channel state which can be represented by distortion of the upper and the lower frequency bands of the received baseband VSB signals. Higher weight is given to the error information having higher reliability. Therefore, the lower error information output from the lower BECM 315, which has relatively higher reliability due to the pilot signal, is usually given the higher weight.

In order to apply appropriate weights according to the channel state, information on the channel state is obtained in various ways. For example, size of the signals input to the upper and the lower BECMs 311 and 315 may be used to determine the weights.

The loop filter 319 passes through and outputs to the NCO 321 only the signal components of the lower band among the final error information output from the combiner 317.

The NCO 321 changes output frequency according to the lower band signal component output from the loop filter 319, thereby changing a sampling clock of the ADC 301.

According to another embodiment of the present general inventive concept, only the spectrum inverter 313 and the lower BECM 315 are used, so that only the lower frequency band of the baseband VSB signal is used.

Figure 5:
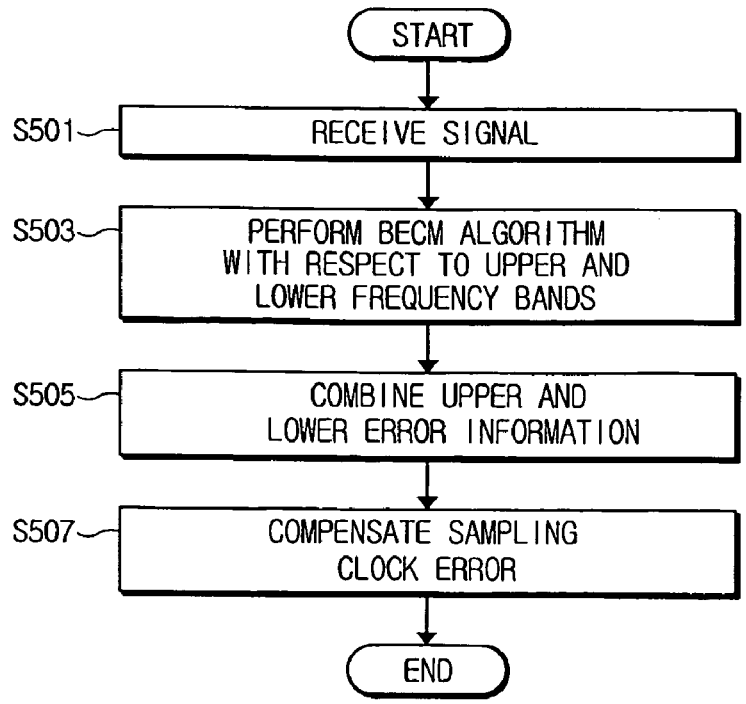
FIG. 5 is a flowchart illustrating operations of the symbol timing recovery apparatus for a VSB-type receiver, according to an embodiment of the present general inventive concept.

FIG. 5 is a flowchart illustrating operations of the symbol timing recovery apparatus for a VSB-type receiver.

The timing recovery unit 310 receives the baseband VSB signal which is the signal transited to the baseband and modulated by the VSB scheme. The received baseband VSB signal has the frequency spectrum as shown by the graph of FIG. 4 (a). The upper frequency band of the baseband VSB signal is approximately 6 MHz that is the frequency band width of the American digital broadcasting of the advanced television system committee (ATSC) standard (operation S501).

The upper BECM 311 performs the BECM algorithm, thereby outputting to the combiner 317 the upper error information which is the information on the error between the symbol phase detected from the received baseband VSB signal and the preset reference symbol phase. Simultaneously, the frequency spectrum of the baseband VSB signal is inverted by the spectrum inverter 313 as shown in FIG. 4 (b) and input to the lower BECM 315.

The lower BECM 315 performs the BECM algorithm, thereby detecting the symbol phase from the inverted baseband VSB signal, and outputs to the combiner 317 the lower error information which is the information on the error between the detected symbol phase and the preset reference symbol.

In another embodiment of the present general inventive concept, the pilot signal component may be deleted from the inverted baseband VSB signal input to the lower BECM 315. To perform this operation, the pilot signal may be detected by the spectrum inverter 313 and deleted from the baseband VSB signal (operation S503).

The generated upper and the lower error information is input to the combiner 317, and the combiner 317 multiplies the upper and the lower error information by the weights K1 and K2, respectively, and adds the multiplied values to thereby obtain the final error information (operation S505).

The loop filter 319 passes through and outputs to the NCO 321 only the signal components of the lower band among the final error information generated by the combiner 317. The NCO 321 changes output frequency according to the lower band signal component output from the loop filter 319, thereby changing a sampling clock of the ADC 301 (operation S507).

Thus, the symbol timing recovery apparatus for a VSB-type receiver is operated through the above-described processes.

As can be appreciated from the above description, since symbol timing recovery is performed using the lower frequency band of the received VSB-modulated signal, the symbol timing recovery can be more effectively achieved even when the upper frequency band is damaged due to multi-path components. Also, efficiency of the overall timing recovery can be improved by using the lower frequency band as well as the upper frequency band of the received signal in performing the symbol timing recovery. As a result, deterioration of the receiving system including the symbol timing recovery apparatus can be prevented.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A symbol timing recovery apparatus used with a Vestigial Side Band VSB)-type receiver, the apparatus comprising:
an analog-to-digital converter (ADC) to receive a signal which is modulated by a vestigial side band (VSB) scheme and to digitalize the received signal using a predetermined sampling clock;
a multiplier to transit the digitalized VSB signal to a baseband;
a spectrum inverter to invert a spectrum by exchanging upper and lower frequency bands of the baseband VSB signal received from the multiplier;
a lower band edge component maximization (BECM) to perform a BECM algorithm with respect to the inverted baseband VSB signal, thereby generating lower error information which is the information on the error between a symbol phase of the received VSB-modulated signal and a preset reference symbol phase;
a loop filter to filter the lower error information of the lower BECM to output a lower band signal; and
a numerically controlled oscillator (NCO) to change a predetermined sampling clock according to the lower band signal from the loop filter.

2. The symbol timing recovery apparatus of claim 1, further comprising:

an upper BECM to perform the BECM algorithm directly with respect to the baseband VSB signal received from the multiplier, thereby generating upper error information which is the information on the error between a symbol phase of the received VSB-modulated signal and a preset reference symbol phase; and
a combiner to multiply the upper and the lower error information of the upper and the lower BECMs by predetermined weights, respectively, and to output to the loop filter final error information obtained by adding the multiplied values.

3. The symbol timing recovery apparatus of claim 2, wherein the BECM algorithm is a Gardener algorithm.

4. The symbol timing recovery apparatus of claim 2, wherein the upper BECM generates harmonic components of the upper frequency band signal from a frequency VSB signal and extracts symbol tone among the plurality of generated harmonic components, the symbol tone having the same phase as the symbol tone with a preset reference symbol phase, and then compares the symbol tone with a preset reference symbol phase to output upper error information of the symbol phase.

5. The symbol timing recovery apparatus of claim 2, wherein the inverter deletes a pilot signal from the baseband VSB signal before inverting the frequency spectrum.

6. The symbol timing recovery apparatus of claim 2, wherein the predetermined weights vary according to reliability of the upper and the lower error information according to a channel state.

7. The symbol timing recovery apparatus of claim 6, wherein the weights are determined by a size of the signals input to the upper rid lower BECMs.

8. The symbol timing recovery apparatus of claim 1, wherein the spectrum inverter detects and deletes a pilot signal of the VSB signal before inverting the spectrum.

9. The symbol timing recovery apparatus of claim 1, further comprising a matched filter provided in front of the spectrum inverter to filter off the baseband VSB signal to increase signal-to-noise ratio.

10. The symbol timing recovery apparatus of claim 1,wherein the VSB-modulated signal is an American digital broadcasting signal of an advanced television system committee (ATSC) standard.

11. A receiver which receives a VSB-modulated signal by performing symbol timing recovery of a received VSB signal using a symbol timing recovery apparatus for a VSB-type receiver, as recited in claim 1.

12. A method of symbol timing recovery for a Vestigial Side Band (VSB)-type receiver, the method comprising:
receiving a VSB-modulated signal and digitalizing the signal using a predetermined sampling clock;
transiting the digitalized VSB signal to a baseband;
inverting a spectrum by exchanging upper and lower frequency bands of the baseband VSB signal;
generating lower error information which is the information on the error between a symbol phase of the received signal and a preset reference symbol phase, by performing a band edge component maximization (BECM) algorithm with respect to the spectrum-inverted signal; and
changing the predetermined sampling clock according to the lower error information.

13. The method of claim 12, further comprising:
performing the BECM algorithm directly with respect to the baseband VSB signal in the transiting operation, thereby generating upper error information which is the information on the error between a symbol phase of the received VSB-modulated signal and a preset reference symbol phase; and multiplying the upper and the lower error information by predetermined weights, respectively, and outputting final error information obtained by adding the multiplied values to the sampling clock changing operation.

14. The method of claim 13, wherein the predetermined weights vary according to reliability of the upper and the lower error information according to a channel state.

15. The method of claim 12, wherein the inverting operation detects and deletes a pilot signal of the VSB signal before inverting the spectrum.

16. The method of claim 12, further comprising filtering off the baseband VSB signal before the inverting operation to increase signal-to-noise ratio.

17. A symbol timing recovery apparatus used with a Vestigial Side Band VSB)-type receiver, the apparatus comprising:
   a multiplier to transit a digitalized signal modulated by a vestigial side band (VSB) scheme signal to a baseband; and
   a timing recovery unit to invert a spectrum by exchanging upper and lower frequency bands of the baseband VSB signal received from the multiplier, to perform a lower band edge component maximization (BECM) algorithm with respect to the inverted baseband VSB signal, thereby generating lower error information which is the information on the error between symbol phase of the received VSB-modulated signal and a preset reference symbol phase, to filter the lower error information of the lower BECM to output a lower band signal, and to change a predetermined sampling clock according to the lower band signal from a loop filter.

18. The symbol timing recovery apparatus of claim 17, wherein the timing recovery unit comprises:

a spectrum inverter to invert the spectrum by exchanging upper and lower frequency bands of the baseband VSB signal received from the multiplier;

a lower BECM to perform the lower band edge component maximization (BECM) algorithm with respect to the inverted baseband VSB signal;

a loop filter to filter the lower error information of the lower BECM; and a numerically controlled oscillator (NCO) to change the predetermined sampling clock according to the lower band signal from the loop filter.

19. The symbol timing recovery apparatus of claim 18, wherein the timing recover unit further comprises:
   an upper BECM to perform the BECM algorithm directly with respect to the baseband VSB signal received from the multiplier, thereby generating upper error information which is the information on the error between a symbol phase of the received VSB-modulated signal and a preset reference symbol phase; and
   a combiner to multiply the upper and the lower error information of the upper and the lower BECMs by predetermined weights, respectively, and to output to the loop filter final error information obtained by adding the multiplied values.

20. A method of symbol timing recovery for a Vestigial Side Band (VSB)-type receiver, the method comprising:
   transiting a digitalized VSB-modulated signal to a baseband;
   inverting a spectrum by exchanging upper and lower frequency bands of the baseband VSB signal;
   detecting error information of respective symbol clocks from the baseband VSB signals of the lower frequency band and the upper frequency band; and
   combining the error information detected to perform symbol timing recovery, wherein the frequency band of the spectrum does not change during the inversion.

* * * * *

UNITED STATES PATENT AND TRADEMARK OFFICE
CERTIFICATE OF CORRECTION

| | | |
|---|---|---|
| PATENT NO. | : 7,634,029 B2 | Page 1 of 1 |
| APPLICATION NO. | : 11/208754 | |
| DATED | : December 15, 2009 | |
| INVENTOR(S) | : Dong-hoon Lee | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1078 days.

Signed and Sealed this

Ninth Day of November, 2010

David J. Kappos
*Director of the United States Patent and Trademark Office*